United States Patent [19]

Rollett et al.

[11] 4,217,562
[45] Aug. 12, 1980

[54] EQUALIZER NETWORKS PROVIDING A BUMP SHAPED RESPONSE

[75] Inventors: John M. Rollett; Alan J. Greaves, both of Ipswich, England

[73] Assignee: The Post Office, London, England

[21] Appl. No.: 937,527

[22] Filed: Aug. 28, 1978

[30] Foreign Application Priority Data

Sep. 7, 1977 [GB] United Kingdom ............... 37358/77

[51] Int. Cl.$^2$ ......................... H03H 7/16; H03H 7/44
[52] U.S. Cl. .................................... 333/28 R; 333/215
[58] Field of Search ...................... 333/28 R, 213, 214, 333/215; 330/107

[56] References Cited

U.S. PATENT DOCUMENTS

| 3,736,517 | 5/1973 | Lim ..................................... 333/28 R |
| 4,012,704 | 3/1977 | Rollett ............................... 333/28 R |

Primary Examiner—Paul L. Gensler
Attorney, Agent, or Firm—Kemon & Estabrook

[57] ABSTRACT

An equalizer network that exhibits stability and may be cascaded with a transmission channel is disclosed. The network includes only two operational amplifiers, resistors and capacitors and provides a bump shaped amplitude characteristic at resonance frequency. The equalizer may be modified to exhibit selectively a 'bump' or 'dip' at resonance, and may be so constructed that trimming operations and the independent selection of parameters is facilitated.

9 Claims, 8 Drawing Figures

EQUALIZER NETWORKS PROVIDING A BUMP SHAPED RESPONSE

This invention relates to equalizer networks.

In telecommunications systems it is often necessary to reduce the amplitude distortion of a transmission channel, so that the loss over the bandwidth of the channel is substantially constant, i.e. within prescribed variation limits. Networks which can be cascaded with a transmission channel to make the loss more or less constant are termed amplitude equalizers. Such equalizers have, in the past, been generally constructed with relatively bulky components such as coils and capacitors. More recently, ways have been sought to eliminate coils from electronic circuits, particularly in low frequency applications (say below 10 kHz) where they tend to be disproportionately large, heavy and expensive. Nowadays it is becoming common to use circuits containing only amplifiers, resistors and capacitors since such circuits can be small, light and can be realised in microelectronic form and can utilise thin film or thick film components.

Such an equalizer is described in U.S. Pat. No. 4,012,704 and this equalizer produces a 'dip' or 'valley' shaped amplitude characteristic at the resonance frequency.

It is one object of the present invention to provide an equalizer network which may be used to provide a 'bump'-shaped amplitude characteristic at the resonance frequency.

Equalizers constructed according to the present invention may be used for:

a. audio telecommunication channel equalization;

b. audio equalization for sound recording, reproduction or measurement, e.g. in the form of "graphic equalizers" which would require a bank of similar equalizers tuned to adjacent frequency bands; or c. equalization of microphones for standard performance tests.

Amplitude equalizer networks when cascaded with a transmission channel also affect the phase response characteristic or its derivative the group delay characteristic of the transmission channel. For some telecommunication purposes, for example in speech transmission, the group delay characteristic is not important and any arbitrary characteristic is acceptable. However, for other purposes, notably for data transmission it is important that the group delay characteristic lies within a fairly narrow band.

It is a further object of the present invention to provide an equalizer network which may act as a group delay equalizer.

According to the present invention in a first aspect there is provided an active equalizer network including first and second differential input operational amplifiers, and input terminal, and output terminal, a reference terminal, a first, a second, a third and a fourth junction point;

said first junction point being connected via a first resistance element to the input terminal, and connected via a second resistance element to the output terminal of the first operational amplifier, and connected to the non-inverting input of the second operational amplifier;

said second junction point being connected via a third resistance element to the output terminal of the first operational amplifier and connected via a first capacitance element to the output terminal of the second operational amplifier;

said third junction point being connected via a fourth resistance element to the output terminal of the second operational amplifier, and connected via a second capacitance element to the input terminal, and connected to the non-inverting input terminal of the first operational amplifier;

said fourth junction point being connected via a fifth resistance element to the output terminal of the first operational amplifier, and connected via a sixth resistance element to the reference terminal, and connected to the non-inverting input of the first operational amplifier;

said output terminal being connected to the output terminal of the first operational amplifier; and the inverting input terminal of the first operational amplifier being connected to the second junction point and the inverting input terminal of the second operational amplifier being connected to the third junction point.

According to the present invention in a second aspect there is provided an active equalizer network including first and second differential input operational amplifiers, and input terminal, an output terminal, a reference terminal, a first, a second, a third and a fourth junction point;

said first junction point being connected via a first resistance element to the input terminal, and connected via a second resistance element to the output terminal of the first operational amplifier, and connected to the non-invertin input of the second operational amplifier;

said second junction point being connected via a third resistance element to the output terminal of the first operational amplifier and connected via a first capacitance element to the output terminal of the second operational amplifier;

said third junction point being connected via a fourth resistance element to the output terminal of the second operational amplifier, and connected via a second capacitance element to the input terminal; and connected to the non-inverting input terminal of the first operational amplifier;

said fourth junction point being connected via a fifth resistance element to the output terminal of the first operational amplifier, and connected via a sixth resistance element to the reference terminal, and connected to the non-inverting input terminal of the first operational amplifier;

said output terminal being connected to the output terminal of the first operational amplifier; and the inverting input terminal of the first operational amplifier being connected to the second junction point and connected to the inverting input terminal of the second operational amplifier.

According to the present invention in a third aspect there is provided an active equalizer network including first and second differential input operational amplifiers, an input terminal, an output terminal, a reference terminal, a first, a second, a third and a fourth junction point;

said first junction point being connected via a first resistance element to the input terminal, and connected via a second resistance element to the output terminal of the first operational amplifier, and connected to the non-inverting input of the second operational amplifier;

said second junction point being connected via a third resistance element to the output terminal of the first operational amplifier and connected via a first capacitance element to the output terminal of the second operational amplifier;

said third junction point being connected via a fourth resistance element to the output terminal of the second operational amplifier, and connected via a second capacitance element to the input terminal; and connected to the non-inverting input terminal of the first operational amplifier;

said fourth junction point being connected via a fifth resistance element to the output terminal of the first operational amplifier, and connected via a sixth resistance element to the reference terminal, and connected to the non-inverting input terminal of the first operational amplifier;

said output terminal being connected to the output terminal of the first operational amplifier; and the inverting input terminal of the first operational amplifier being connected to the first junction point and to the non-inverting input terminal of the second operational amplifier, and the inverting input terminal of the second operational amplifier being connected to the second junction point.

The present invention in the three aspects described above provides an active equalizer network which may have an amplitude characteristic with a 'bump' at the resonance frequency of the circuit.

An additional resistance element, a seventh resistance element, may be connected between said fourth junction point and the non-inverting input terminal of the first operational amplifier. This additional resistance element allows the bandwidth of the 'bump' in the amplitude characteristic of the network to be varied by varying the value of this resistance element without thereby varying the 'height' of the 'bump' or the resonance frequency of the network.

An eighth resistance element may be connected between the fourth junction point and the input terminal. This additional resistance element allows the values of the circuit components to be chosen to give an amplitude characteristic with a 'dip' or 'valley' at the resonance frequency.

The eighth and fifth resistance elements may comprise a single potentiometer having a variable tapping point, where the fourth junction point is connected to said tapping point. The fifth and eighth resistance elements may be connected to said fourth junction point via a ninth resistance element.

This additional resistance allows the amplitude and group delay characteristics of the network to be varied independently and linearly by varying the value of resistance elements in the network.

Embodiments of the invention will now be described, by way of example only, with reference to the accompanying drawings.

Figure 1:
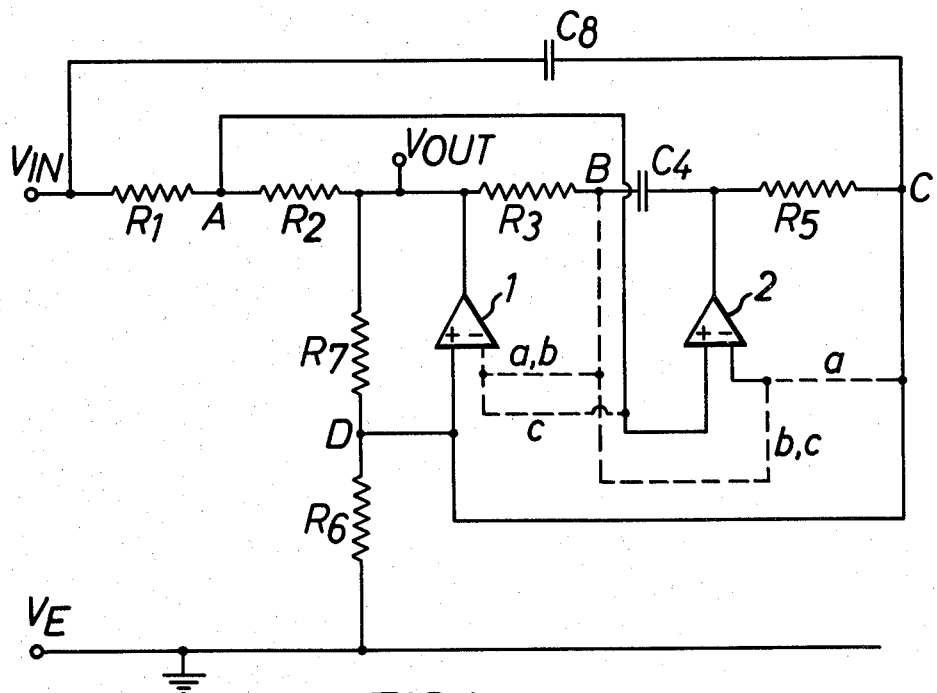
FIG. 1 is a circuit diagram illustrating a basic circuit and possible variations in accordance with the present invention.

Referring to FIG. 1, a basic form of a circuit is shown and essentially it comprises two high-gain differential-input operational amplifiers 1 and 2 as active elements, two capacitors, and several resistors; the circuit having frequency response characteristics (centre frequency, amplitude, Q-factor) which can be chosen to give an amplitude 'bump' of a required shape at the resonance frequency of the circuit.

The circuit has an input terminal $V_{in}$, an Earth reference terminal $V_E$ and an output terminal $V_{out}$. Four junction points of the circuit will be identified for ease of description and designated respectively as A, B, C and D. The output terminal of the operational amplifier 1 is connected directly to the circuit output terminal $V_{out}$ and is connected via series resistances $R_2$ and $R_1$ to the circuit input terminal $V_{in}$. The junction between the resistors $R_1$ and $R_2$, the junction point A, is connected to the non-inverting input terminal of the operational amplifier 2. The output terminal of the operational amplifier 1 is further connected via a resistor $R_3$ to the junction point B, which junction point is connected to the output terminal of the operational amplifier 2 via a capacitor $C_4$. The output terminal of the operational amplifier 2 is further connected via a resistor $R_5$ to the junction point C, and the junction point C is connected to the non-inverting input terminal of the operational amplifier 1.

The output terminal of the operational amplifier 1 is connected to the Earth terminal $V_E$ by series resistors $R_7$ and $R_6$. The junction point D between the resistors $R_6$ and $R_7$ is connected to the non-inverting input terminal of the operational amplifier 1. A capacitor $C_8$ is connected between the non-inverting input terminal of the operational amplifier 1 and the circuit input terminal $V_{in}$.

The remaining part of the circuit comprises the circuit connections to the inverting input terminals of the operational amplifiers 1 and 2. In common with other types of circuits in which operational amplifier networks are used to replace conventional inductances the number of theoretically possible circuit variations is severly reduced in practice by problems of d.c. stability. That is to say the majority of these circuits produce square wave oscillations or latch up. In the circuit illustrated in FIG. 1 there are three ways of connecting the inverting input terminals of the operational amplifiers to the rest of the circuit which lead to d.c. stable circuits. These three ways have been condensed into the single circuit diagram of FIG. 1 by the alternative connections a, b and c shown by dotted lines. In practice, only one of these three possible connections would be provided.

In the circuit with the connections a, the inverting input terminal of the operational amplifier 1 is connected to the junction point B and the inverting input terminal of the operational amplifier 2 is connected to the junction point C. It has been discovered that this circuit, while achieving d.c. stability, is liable to oscillate at high frequencies particularly when cascaded, and its usefulness is therefore limited.

In the circuit with the connections b, the inverting input terminals of both the operational amplifiers 1 and 2 are connected to the junction point B. This circuit, while stable at high frequencies when operated alone, tends to oscillate when four or more sections are cascaded; it is therefore useful in certain circumstances only.

In the circuit with the connections c, the inverting input terminal of the operational amplifier 1 is connected to the non-inverting input terminal of the operational amplifier 2 and the inverting input terminal of the operational amplifier 2 is connected to the junction point B. This circuit is the most stable of the three, and is substantially free from oscillations at high frequencies even when a number of sections are cascaded.

Assuming that the two operational amplifiers 1 and 2 have very high input impedance, very low output impedance and very high gain, circuit analysis yields the following expression for the transfer function of the equalizer circuit of FIG. 1, and the expression holds whichever of the three alternative connections a, b or c is employed.

$$\frac{v_{out}}{v_{in}} = \frac{G_1G_3G_5 - sc_4(G_1G_6 + G_1G_7) + s^2c_4c_8G_2}{G_1G_3G_5 + sc_4(G_2G_6 - G_1G_7) + s^2c_4c_8G_2} \quad (1)$$

where $G_1$ represents the conductance of the resistor $R_1$, etc;
$c_4$ represents the capacitance of the capacitor $C_4$ etc;
and s is the complex frequency variable.

The transfer function T(s) of second-order biquadratic amplitude equalizer is given generally by:

$$T(s) = \frac{s^2 + hb\omega_o s + \omega_o^2}{s^2 + b\omega_o s + \omega_o^2} \quad (2)$$

where $\omega_o$ represents the resonance angular frequency;
h represents the amplitude at the resonance frequency;
and b is the reciprocal of the Q-factor of the circuit.

Figure 2:
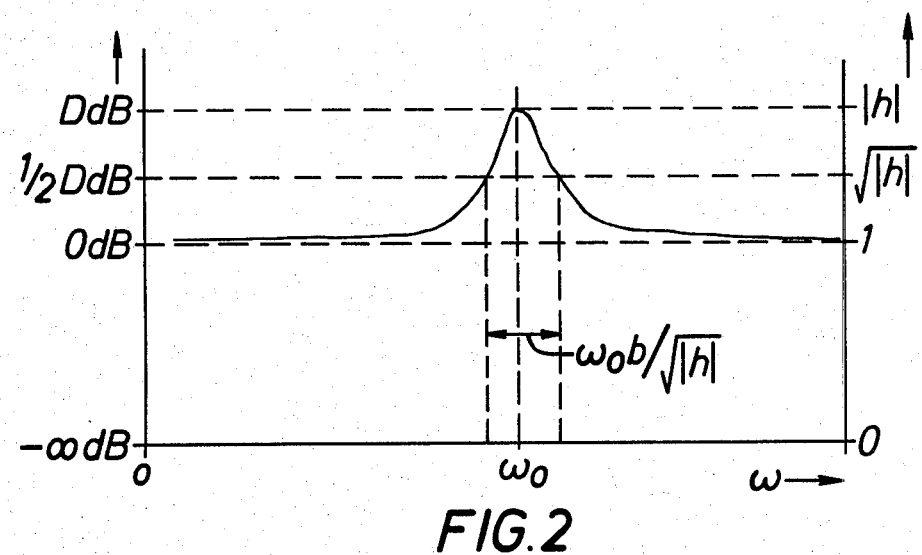
FIG. 2 is a graph showing the relationship between signal amplitude plotted on the ordinate and shown as gain on the lefthand side and angular frequency plotted on the abscissa for the circuit of FIG. 1.

These parameters are illustrated in FIG. 2 by a graph showing the relationship between signal amplitude (loss in dB) and angular frequency. The bandwidth is defined as the difference in frequency at half the maximum loss produced at the resonant frequency of the equalizer network, and equals $\omega_o b \sqrt{|h|}$.

From equations 1 and 2 the following equations for $\omega_o$, h and b for the circuit of FIG. 1 can be obtained.

$$\omega_o = \sqrt{\frac{G_1G_3G_5}{G_2c_4c_8}} = \sqrt{\frac{r_2}{r_1} \cdot \frac{1}{r_3r_5c_4c_8}} \quad (3)$$

$$h = -\frac{G_1G_6 + G_1G_7}{G_2G_6 - G_1G_7} = -\frac{r_6 + r_7}{r_7(r_1/r_2) - r_6} \quad (4)$$

$$b = \frac{c_4(G_2G_6 - G_1G_7)}{\sqrt{G_1G_2G_3G_5c_4c_8}} = \sqrt{\frac{c_4}{c_8}}\sqrt{\frac{r_2}{r_1}} \frac{(r_7r_1/r_2 - r_6)\sqrt{r_3r_5}}{r_6r_7} \quad (5)$$

where $r_1$ is the resistance of the resistor $R_1$ etc.

The equations 3-5 may be re-arranged to give formulae for the components of the circuit in terms of the parameters $\omega_o$, b, h. One possible set of formulae will now be developed. The resistances $r_1$ and $r_2$ appear only as a ratio in the equations and it is therefore convenient to make this ratio substantially unity thereby reducing the number of different values of the resistances and leading to economy in construction. It will therefore be assumed (for convenience, not of necessity) that $r_1 = r_2$. For similar reasons it is convenient to take $c_4 = c_8 = c$, and $r_3 = r_5 = r$.

The equations 3-5 then become:

$$\omega_o = 1/rc \quad (6)$$

$$h = -\frac{r_6 + r_7}{r_7 - r_6} \quad (7)$$

$$b = \frac{r(r_7 - r_6)}{r_6r_7} \quad (8)$$

With the above arbitrary assumption, made for convenience, one possible set of design formulae for the values of component elements is:

$$r_1 = r_2 \quad (9)$$

$$r_3 = r_5 = r \quad (10)$$

$$c_4 = c_8 = c = 1/\omega_o r \quad (11)$$

$$r_6 = 2r/[b(|h|+1)] \quad (12)$$

$$r_7 = 2r/[b(|h|-1)] \quad (13)$$

It will be noted that from equation (7), the value of h, the amplitude at resonance frequency is always greater than unity, and from equation (1) at low frequencies (s→0) and at high frequencies (s→∞) the amplitude tends to unity. Thus the amplitude characteristics of the equalizer always exhibits the 'bump'-shape, as illustrated in FIG. 2, with a maximum at the resonance frequency. The height of the 'bump' is $|h|-1$, and this height is given by equation (4) as:

$$|h| - 1 = \frac{r_2(2r_6 + r_7) - r_1r_7}{r_1r_7 - r_2r_6} \quad (14)$$

or, under the arbitrary assumptions above, from (7) as:

$$|h| - 1 = \frac{2r_6}{r_7 - r_6} \quad (14^1)$$

In practice, it is not easy to choose the values of the circuit of FIG. 1 to give a desired 'bump' characteristic because the effects of stray capacitances, component tolerances and amplifier imperfections are all liable to cause the equalizer to depart from the theoretical characteristic. In addition, the various parameters such as bump height and bandwidth interact thereby limiting or complicating the achievement of a desired characteristic.

Figure 3:
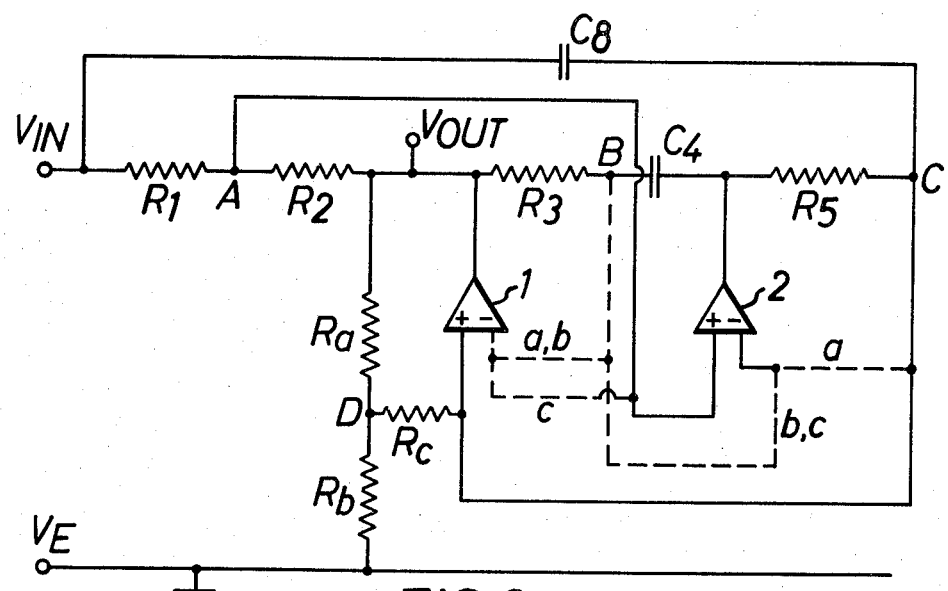
FIG. 3 is a circuit diagram illustrating a modification of the basic circuit which allows a more independent selection of circuit parameters.

A modification of the basic circuit of FIG. 1 will now be described with reference to FIG. 3. The operation of the circuit of FIG. 1 is not affected by the addition of a resistor connected between the output terminal $V_{out}$ and the Earth terminal $V_E$. A resistor connected in this manner forms a delta network with the resistors $R_6$ and $R_7$, and this network can be replaced by a star network as is shown in FIG. 3. The circuit shown in FIG. 3 is the same as the basic circuit shown in FIG. 1 apart from the replacement of resistors $R_6$ and $R_7$ by new resistors $R_b$ and $R_a$ and the addition of a further resistor $R_c$ between the junction point D and the non-inverting input terminal of the operational amplifier 1. The resistances of the resistors $R_a$, $R_b$ and $R_c$ are related to the resistances of the resistors $R_6$ and $R_7$ of FIG. 1 by the following equations:

$$r_6 = P/r_a; \quad r_7 = P/r_b \tag{15}$$

where $$P = r_b r_c + r_c r_a + r_a r_b \tag{16}$$

The equation for the resonance frequency of the circuit of FIG. 3 is the same as that for the circuit of FIG. 1 and is given by equation (3). The equation for the resonance amplitude $|h|$ of the circuit of FIG. 3 however becomes:

$$|h| = \frac{r_a + r_b}{r_a(r_1/r_2) - r_b} \tag{17}$$

the 'bump' height:

$$|h| - 1 = \frac{r_a + 2r_b - r_a(r_1/r_2)}{r_a(r_1/r_2) - r_b} \tag{18}$$

and the reciprocal Q-factor:

$$b = \sqrt{\frac{c_4}{c_8}} \sqrt{\frac{r_2}{r_1}} \sqrt{r_3 r_5} \frac{(r_1 r_a - r_2 r_b)}{r_2(r_b r_c + r_c r_a + r_a r_b)} \tag{19}$$

The determining eqations for the amplitude/frequency characteristic of the circuit of FIG. 3 may be taken as being equations (3), (18) and (19). Consideration of equation (3) shows that the resonance frequency $\omega_o$ can be chosen by adjusting the values of any of the components $R_1$, $R_2$, $R_3$, $R_5$, $C_4$ and $C_8$. In low frequency circuits it is usually preferable to adjust resistors rather than capacitors; it will therefore be assumed that the values of the capacitors $C_4$ and $C_8$ remain fixed. As previously mentioned for the circuit of FIG. 1, the ratio $r_1/r_2$ occurs in all three determining equations, and it is convenient to make $r_1/r_2 = 1$.

Thus $\omega_o$ may be chosen by suitably choosing the values of either or both the resistors $R_3$ and $R_5$.

Consideration of equation (18) shows that the 'bump' height $|h| - 1$ may be chosen by adjusting the values of either or both the resistors $R_a$ and $R_b$ without affecting the previously chosen resonance frequency $\omega_o$.

Although the reciprocal Q-factor b is dependent on the values of the resistors $R_3$, $R_5$, $R_a$ and $R_b$ and so is varied as these values are varied in the selection of $|h| - 1$ and $\omega_o$, provided that it is the last of the three parameters to be chosen the reciprocal Q-factor b may be chosen by adjusting the value of the resistor $R_c$ as may be seen from equation (19).

The circuit of FIG. 3 may be slightly modified to give a practical adjustable circuit so that the trimming operations described above may be easily carried out. The modifications comprise replacing the resistors $R_3$ (or $R_5$) and $R_c$ by variable resistors, and replacing the series resistors $R_a$ and $R_b$ by a potentiometer connected at its tapping point to the resistor $R_c$.

In microelectronic technology it is often only possible to increase the value of a resistance. In which case, the following alternative trimming procedure is preferable.

(1) Increase $r_2$ to increase $\omega_o$, or increase $r_1$, $r_3$ or $r_5$ to decrease $\omega_o$.

(b 2) Increase $r_b$ to increase $|h| - 1$, or increase $r_a$ which will normally decrease $|h| - 1$.

(3) Increase $r_c$ to increase the Q-factor; the initial Q-factor can be designed to lie below the required Q-factor for the worst-case spread of initial element values.

As a telecommunications channel-loss equalizer, the sequence of adjustments to the circuit are typically as follows:

(i) the resonance frequency is set to a frequency of minimum loss (ii) the 'bump' height is adjusted to make the channel-loss more unifrom, and (iii) the bandwidth or Q-factor is adjusted to provide the widest range of uniform loss.

In practice the finite bandwidths of the amplifiers 1 and 2 cause the equalizer characteristic to be slightly asymmetric; the asymmetry is greater the more the resonance frequency approaches the gain-bandwidth products of the amplifiers. Usually this distortion of the characteristic is too slight to be of consequence, but it can if necessary be connected in any of the following ways ie. connection of a large-value resistance between the juntion between the resistors $R_1$ and $R_2$, and earth; or connection of a small-valued capacitance across any one of resistors $R_1$, $R_3$ or $R_5$.

The asymmetry may be over-compensated, ie. made greater in the opposite sense, by using a smaller resistance or larger capacitances. It may be made more pronounced by connection of a capacitor from the junction of the resistors $R_1$ and $R_2$ to earth, or by connecting a capacitor across resistor $R_2$.

The impedances of the compensating (or distorting) components just described would generally be an order of magnitude greater than the values of the components forming the remainder of the equalizer circuit.

In practice, the resonance frequencies of a set of equalizers will be set through the channel-band, and the 'bump' heights and then the Q-factor adjusted to give a roughly equal ripple loss characteristic.

Figure 4:
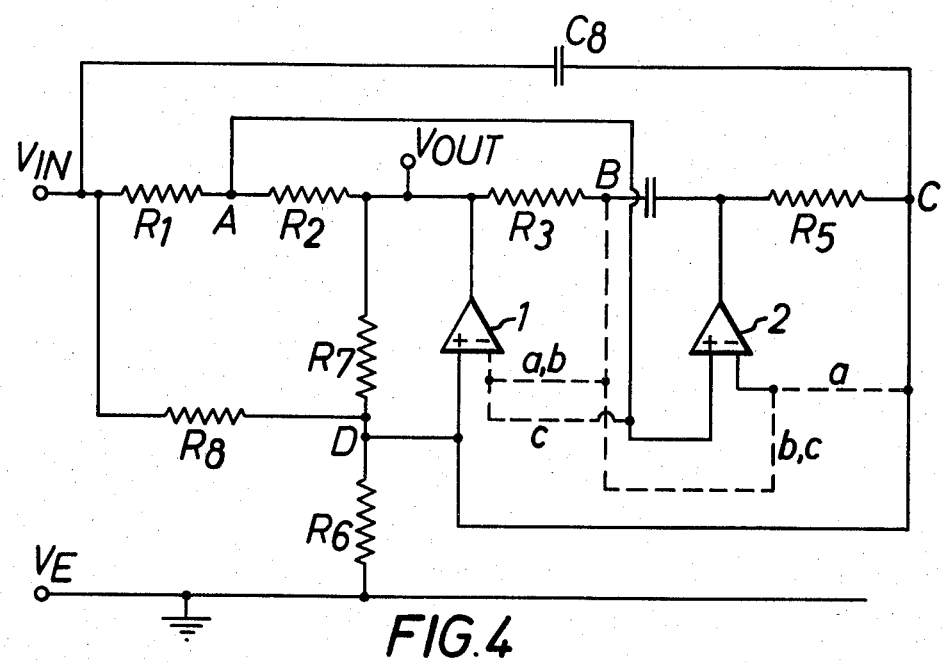
FIG. 4 is a circuit diagram illustrating a modification of the basic circuit which allows the general shape of the amplitude characteristic of the basic circuit to be varied.

Referring now to FIG. 4, the circuit shown comprises the equalizer circuit of FIG. 1 with an additional resistor $R_8$ connected between the junction point D and the circuit input terminal $V_{in}$. The circuit of FIG. 4 is a combination of the equalizer circuit of FIG. 1 which gives a 'bump' type amplitude characteristic and an equalizer circuit described in U.S. Pat. No. 4,012,704 which gives a 'dip' type characteristic. The circuit of FIG. 4 allows the selection of a 'dip' or 'bump' type amplitude characteristic of desired shape and centre frequency.

As was the case with the circuit of FIG. 1, whichever of the three possible connections a, b and c of the inverting input terminals of the operational amplifiers 1 and 2 is taken the operation of the circuit is unaltered.

The general transfer function of the circuit of FIG. 4 is given by:

$$\frac{V_{out}}{V_{in}} = \frac{G_1 G_3 G_5 + sc_4(G_2 G_8 - G_1 G_6 - G_1 G_7) + s^2 c_4 c_8 G_2}{G_1 G_3 G_5 + sc_4(G_2 G_8 + G_2 G_6 - G_1 G_7) + s^2 c_4 c_8 G_2} \tag{20}$$

The parameters of the general transfer function are related to the element values of the circuit by the following equations:

$$\omega_o = \sqrt{\frac{G_1 G_3 G_5}{G_2 c_4 c_8}} = \sqrt{\frac{r_2}{r_1}} \frac{1}{r_3 r_5 c_4 c_8} \quad (21)$$

$$h = \frac{G_2 G_8 - G_1 G_6 - G_1 G_7}{G_2 G_8 + G_2 G_6 - G_1 G_7} = \quad (22)$$

$$\frac{(r_1/r_2)r_6 - r_8 - (r_6 r_8/r_7)}{(r_1/r_2)(r_6 + r_8) - (r_6 r_8/r_7)}$$

$$b = \frac{c_4[G_2(G_8 + G_6) - G_1 G_7]}{\sqrt{G_1 G_2 G_3 G_5 c_4 c_8}} = \quad (23)$$

$$\sqrt{\frac{c_4}{c_8}} \sqrt{\frac{r_2}{r_1}} \frac{\sqrt{r_3 r_5}}{r_6 r_8} [(r_1/r_2)(r_6 + r_8) - r_6 r_8/r_7]$$

As before, the values of the resistors $R_1$ and $R_2$ appear only as a ratio and it is convenient to choose them substantially equal, and also to take $c_4 = c_8 = c$ and $r_3 = r_5 = r$.

The above equations then become:

$$\omega_o = 1/rc \quad (24)$$

$$h = \frac{r_6 - r_8 - (r_6 r_8/r_7)}{r_6 + r_8 - (r_6 r_8/r_7)} \quad (25)$$

$$b = \frac{r[r_6 + r_8 - (r_6 r_8/r_7)]}{r_6 r_8} \quad (26)$$

One possible set of design formulae for the element values, if the arbitrary restrictions mentioned above are made, is therefore $$r_1 = r_2 \quad (27)$$

$$r_3 = r_5 = r \quad (28)$$

$$c_4 = c_8 = c = \frac{1}{\omega_o r} \quad (29)$$

$$r_6 = 2r/b(1 - h) \quad (30)$$

$$\frac{r_7 r_8}{r_7 - r_8} = 2r/b(1 + h) \quad (31)$$

It should be noted that if a value of amplitude greater than unity is required to give a 'bump' characteristic then $|h| > 1$ necessitates $h < -1$, with the result that from equation (30) $R_6$ is necessarily positive, and from equation (31) $R_8 > R_7$.

The particular usefulness of the circuit of FIG. 4 is only fully realized in a version which can provide either a 'dip' or a 'bump' characteristic as required, for example by manual adjustment. One possibility would be to provide the resistors $R_7$ and $R_8$ by means of a variable potentiometer, with the moving contact of the potentiometer forming the junction between the resistors $R_7$ and $R_8$. If the resistor $R_6$ is also variable, then it can be seen from equations (25) and (27) that both h and b can be varied, to provide either a 'bump' or a 'dip' characteristic with a variable bandwidth. However, the two variable controls each affect both bandwidth and height, so that it would be necessary to make repeated alternate adjustments of both controls. It is preferable to provide means for independent adjustment of these parameters, and a modification of the circuit of FIG. 4 which achieves this objective will now be described.

Figure 5:
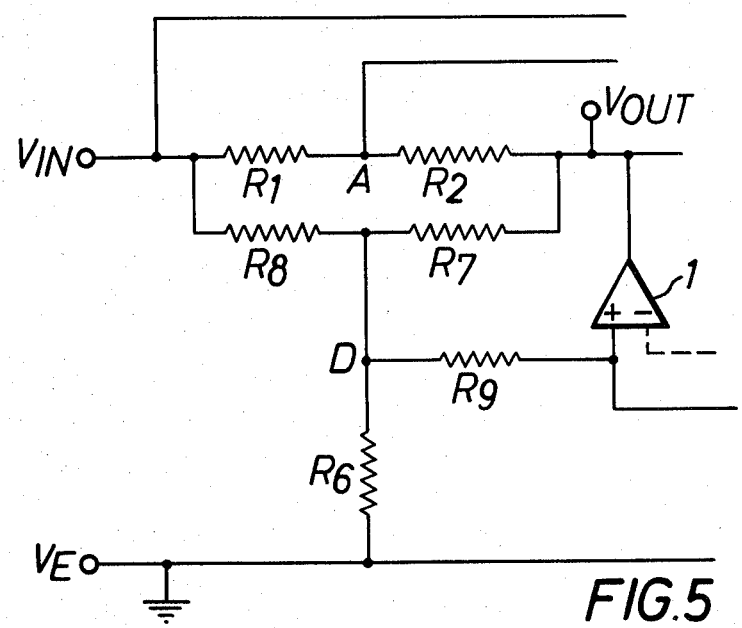
FIGS. 5 and 6 are diagrams of a part of the circuit of FIG. 4 illustrating further modifications.

Referring now to FIG. 5, part of the circuit of FIG. 4 is shown with the modification that an additional resistor $R_9$ is connected between the junction point D and the non-inverting input terminal of the operational amplifier.

The transfer function of this circuit is given by:

$$\frac{V_{out}}{V_{in}} = \frac{G_1 G_3 G_5 + s^2 c_4 c_8 G_2 + s c_4 (G_2 G_8 - G_1 G_6 - G_1 G_7)m}{G_1 G_3 G_5 \quad s^2 c_4 c_8 G_2 \quad s c_4 (G_2 G_8 + G_2 G_6 - G_1 G_7)m} \quad (32)$$

where $m = G_9/(G_6 + G_7 + G_8 + G_9) \quad (33)$

It will be seen that the effect of the additional resistor $R_9$ is to multiply the first-order terms in s in both the numerator and denominator of the transfer function by the factor m.

It follows that the expression for h given in equation (22) is completely unaffected, as is the expression for $\omega_o$ given in equation (21). However, the expression for b now becomes:

$$b = m \sqrt{\frac{c_4}{c_8}} \sqrt{\frac{r_2}{r_1}} \frac{\sqrt{r_3 r_5}}{r_6 r_8} [(r_1/r_2)(r_6 + r_8) - r_6 r_8/r_7] \quad (34)$$

or, with the simplifying choices of $r_1 = r_2$, $c_4 = c_8$, $r_3 = r_5 = r$:

$$b = m \frac{r[r_6 + r_8 - (r_6 r_8/r_7)]}{r_6 r_8} \quad (35)$$

The expression for m can be rewritten from equation (33) as:

$$m = 1/[1 + r_9\{r_6 + r_8 + (r_6 r_8/r_7)\}/r_6 r_8] \quad (36)$$

It will be apparent from equations (33) to (36) that varying the value of the resistor $R_9$ will alter m and hence alter b, without thereby affecting either $\omega_o$ or h. The introduction of the extra resistor $R_9$ therefore allows independent adjustment of b, and hence the Q-factor or bandwidth.

The determining equation for the modified circuit of FIGS. 4 and 5 are therefore (21), (22) and (34) with (36). The resonance frequency $\omega_o$ can be trimmed by adjusting any of the components $R_1$, $R_3$, $R_5$, $C_4$, $C_8$, $R_2$. In low-frequency or microelectronic circuits it is usually preferable to adjust resistors rather than capacitors, and so it will be assumed from now on that the values of the capacitors $C_4$ and $C_8$ are fixed; it is an advantage that they can have substantially but not necessarily equal values. As the ratio $(r_2/r_1)$ occurs in three of the equations, it is convenient to assume that the values of the resistors $R_1$ and $R_2$ are fixed, and substantially equal. Thus it is found that in practice the resonance frequency $\omega_o$ is best adjusted by adjusting the resistor $R_3$ or the resistor $R_5$.

Examination of equation (22) shows that a range of values of $|h|$ from below 1 to greater than 1 can be achieved by varying either the resistor $R_7$ or the resistor $R_8$ or both by means of a potentiometer. It is important to ensure that the range of adjustment is not such as to make b zero or approach too close to overload. If the resistors $R_8$ and $R_7$ are provided by a series connection of a resistor, a potentiometer and a resistor, then the range of adjustment for 'bump' or 'dip' characteristics can be limited to a suitable range of practical requirements. If the values of the resistor $R_8$ or $R_7$ are altered this will also alter b, but after $|h|$ has been set to the required value, the value of b can be adjusted by altering the resistor $R_9$, which has no effect on the other parameters $|h|$ or $\omega_o$. The range of variation of the resistor $R_9$ can also be limited by including a fixed value resistor. A possible version of the circuit for manual adjustment would be as shown in FIG. 6, which again shows only the left-hand part of the full schematic diagram of the circuit, the rest of which would resemble the right-hand part of FIG. 4. The two variable controls are used for setting the parameters indicated in brackets.

The trimming procedure is therefore as follows:

(1) Adjust the values of the resistor $R_3$ (or $R_5$) to set the resonance frequency $\omega_o$ (which also alters b, but not h).

(2) Adjust the value of the resistor $R_7$, $R_8$, or both by means of a potentiometer, to set the amplitude $|h|$ at the resonance frequency to the required value (either 'bump' or a 'dip'), again altering b, but not $\omega_o$ already set.

(3) Adjust the value of the resistor $R_9$ to set b and Q-factor ($Q=1/b$), without affecting either $\omega_o$ or h.

In practice a certain amount of iteration may be necessary.

In microelectronic technology it is often only possible to increase the value of a resistance. In this case an alternative set of adjustment procedures is available.

(4) Increase the value of the resistor $R_2$ to increase $\omega_o$, or increase the value of any of the resistors $R_1$, $R_3$ or $R_5$ to decrease $\omega_o$.

(5) Increase the value of the resistor $R_8$ to increase the amplitude $|h|$ at the resonance frequency, or increase the value of the resistor $R_7$ to decrease $|h|$.

(6) Increase the value of the resistor $R_9$ to increase the Q-factor; the initial Q-factor can be designed to lie below the required Q-factor for the worst-case spaced of initial element values. Alternatively, the Q-factor can be reduced without altering $\omega_o$, by increasing the values of both the resistors $R_2$ and $R_3$ in the same proportion.

The finite bandwidths of the amplifiers cause the equalizer characteristics to be slightly asymmetric; the asymmetry increases as the resonance frequency approaches the gain-bandwidth product of the amplifiers. This may be compensated as previously described.

In principle, the networks previously described can be used both for selecting an appropriate amplitude characteristics and for selecting an appropriate group delay characteristics. For example, the 'bump' or 'dip' amplitude equalizer circuit shown in FIG. 4 provides a group delay if $T_0$ at its resonance frequency $\omega_o$, where $T_0$ is given by:

$$T_o = \frac{2c_8 G_2 G_6 (G_1 + G_2)}{(G_2 G_8 - G_1 G_6 - G_1 G_7)(G_2 G_8 + G_2 G_6 - G_1 G_7)} \quad (37)$$

If it is assumed, as before, that $G_1$ and $G_2$ (ie. $R_1$ and $R_2$) are substantially equal in value, then $$T_o = -\frac{4c_8 r_6}{1 - \left[\dfrac{r_6(r_7 - r_8)}{r_7 r_8}\right]^2} \quad (38)$$

Thus it might be possible to find values of the resistors $R_6$, $R_7$ and $R_8$ which would simultaneously give a required value of $T_0$, and also a required value of h from equation (25). It would however be virtually impossible to trim a circuit to achieve the required values, since altering any of the three components would alter both h and $T_0$.

The addition of the resistor $R_9$, to form the circuit shown in FIG. 5, transforms the situation. The value of $T_0$ is now multiplied by the factor $m^{-1}$, where m is as given by equations (33) or (36), while the value of h remains, as before, as in equation (25). With the convenient assumption that $R_1$ and $R_2$ are substantially equal being maintained the equations become:

$$T_o = -4c_8 \frac{r_6 + r_9 + r_6 r_9 (r_8^{-1} + r_7^{-1})}{1 - [r_6(r_8^{-1} - r_7^{-1})]^2} \quad (39)$$

$$h = -\frac{1 - r_6(r_8^{-1} - r_7^{-1})}{1 + r_6(r_8^{-1} - r_7^{-1})} \quad (40)$$

It can be seen that $T_0$ can now be set by adjusting the resistor $R_9$, without producing any effect on the value of h although, of course it will affect b—the reciprocal Q-factor. The procedure for setting up the network to provide required values of amplitude and group delay at the resonance frequency is firstly to set h, by varying the value of resistance $R_8$ or $R_7$ (or both, as in FIG. 6), and then to set $T_0$ by varying the value of the resistor $R_9$.

Figure 6:
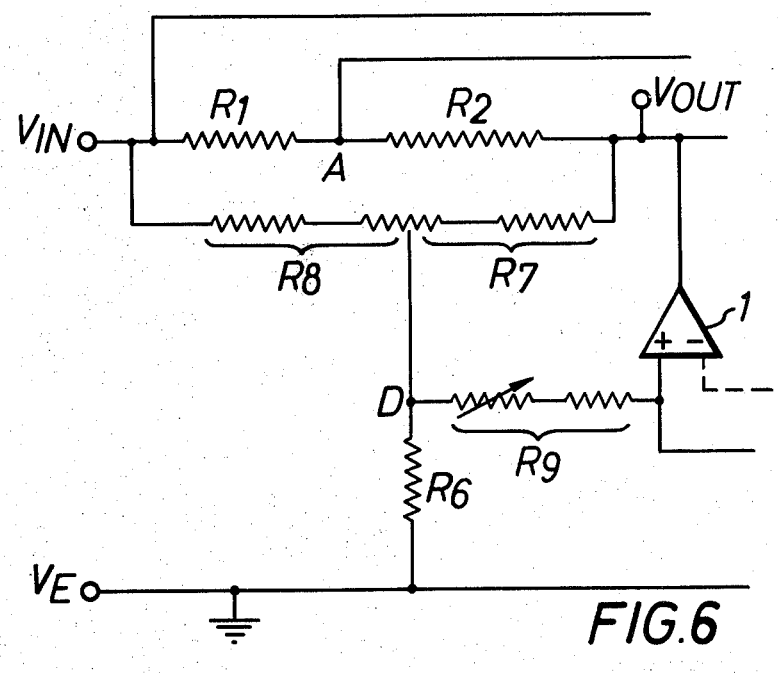

The network of FIG. 5 or its equivalent with variable controls, FIG. 6, therefore has many of the desired characteristics of an equalizer for independent control of amplitude and group delay.

One further consideration is the law relating to the way the network property varies with the controlling resistance. Equation (39) shows that equal increments of the value of the resistor $R_9$ lead to equal increments of group delay $T_0$—that is the law is linear. The law relating amplitude h with variations of the value of resistors $R_7$ and $R_8$ (or both, as in FIG. 6) is, however, complex (in fact bi-quadratic). However, if the range of amplitude variation required is moderate, for example $\pm 3$dB, then a slight modification of the circuit leads to a law which can be made approximately linear.

Figure 7:
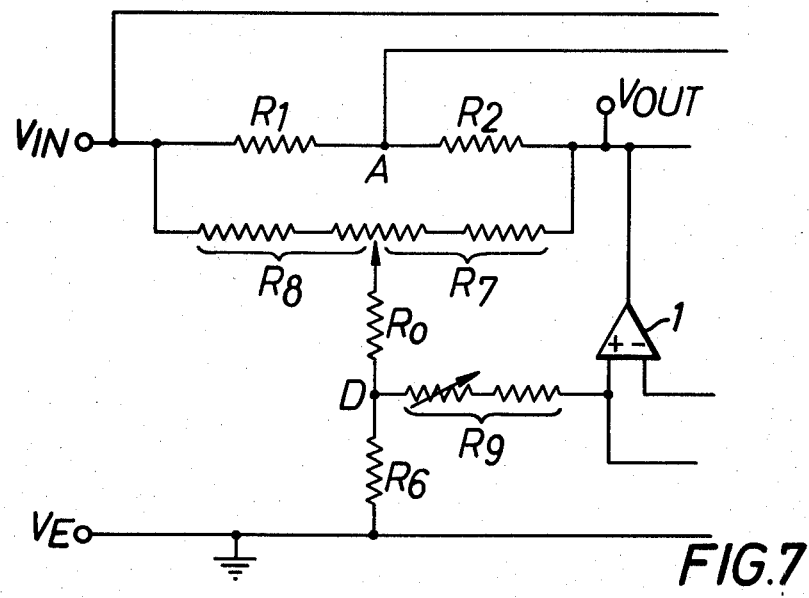
FIG. 7 is a circuit diagram showing how linear amplitude adjustment may be achieved.

The modification is shown in FIG. 7, and involves adding an extra resistor $R_0$ between the junction D and the junction between resistors $R_7$ and $R_8$. If it is again assumed that $r_1$ and $r_2$ are substantially equal, the equations for group delay and amplitude are now:

$$T_o = -4c_8 \frac{r_6 + r_9 + kr_6 r_9 (r_8^{-1} + r_7^{-1})}{1 - [kr_6(r_8^{-1} - r_7^{-1})]^2} \quad (41)$$

$$h = -\frac{1 - kr_6(r_8^{-1} - r_7^{-1})}{1 + kr_6(r_8^{-1} - r_7^{-1})} \quad (42)$$

where $k = [1 + r_0(r_8^{-1} + r_7^{-1})]^{-1}$ \quad (43)

It is found that a suitable choice of the ratios of $r_0$, $r_6$ and the sum of $r_7$ and $r_8$ allows the following to be achieved.

(i) a law relating amplitude h, in dB, with variations in the potentiometer setting of $R_7$ and $R_8$ which is approximately linear, to within a few percent, for variations in h of a few dB; eg. $\pm 3$dB;

(ii) a maximum change in $T_0$ of a few percent, for variations in h of a few dB, eg. $\pm 3$dB;

(iii) a sensitivity of either parameter h or $T_0$ to random variations in any component of no more than about 1 or 2;

(iv) while it will be recalled that $T_0$ can be varied linearly by altering $r_9$ without any effect on h.

One possible choice for the ratios of $r_0$, $r_6$ and $(r_7+r_8)$, included here purely for the sake of example, is:

$$r_0:r_6:(r_7+r_8)=1:1:1$$

Figure 8:
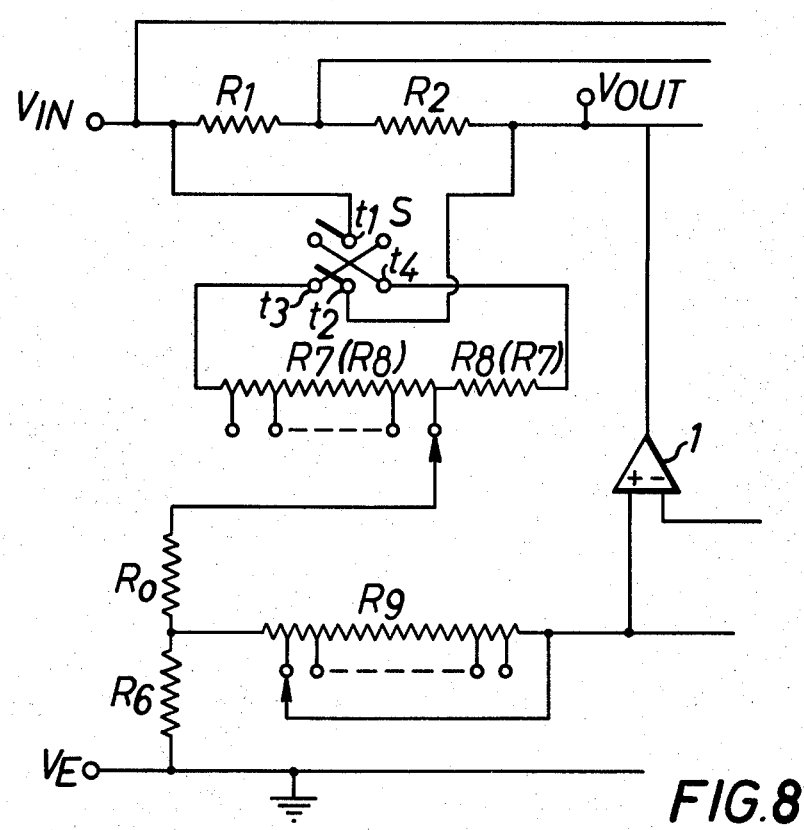
FIG. 8 is a circuit diagram of a network which allows amplitude and group delay to be varied in steps.

The amplitude at resonance may be varied continuously by using a potentiometer, as indicated in FIGS. 6 and 7. Alternatively if steps of gain or loss of definite value are required, a switch can be used with a set of fixed resistors, together with a double-pole, double-throw, change-over switch to select either gain or loss. A suitable arrangement is shown in FIG. 8, where the resistors $R_7$ and $R_8$ are provided by a potentiometer having fixed selectable tapping points at intervals, the tapping points providing the selectable junctions between the resistors $R_7$ and $R_8$. A double-pole, double-throw, change-over switch S, having terminals $t_1$, $t_2$, $t_3$, $t_4$ is connected into the circuit so that the contact terminals $t_1$ and $t_2$ are connected either respectively to terminals $t_3$ and $t_4$ or respectively to terminals $t_4$ and $t_3$. The terminal $t_1$ is connected to the input terminal $V_{in}$, the terminal $t_2$ is connected to the output terminal $V_{out}$, and the terminals $t_3$ and $t_4$ are connected to respective ends of the potentiometers. Thus by throwing the switch the two parts of the potentiometer, one on each side of the tapping point, exchange circuit positions, thereby replacing the value of resistor $R_8$ by that of $R_7$ and vice versa.

In the foregoing it has been assumed that the bandwidths of the amplifier are much greater than the frequency range over which the equalizer is required to provide a given characteristic. If the resonance frequency is more than a small fraction of the bandwidth, say about 1%, then certain discrepancies between the practical and ideal characteristics may be observed, and it may be desirable to correct them. Ways of correcting the practical characteristics are now described.

One effect of the finite bandwidths of the amplifiers shows up as an asymmetrical 'wiggle' around the resonance frequency, when a flat response would be expected. The 'wiggle' is due to the non-coincidence of the pole and zero frequencies. It can be shown that the pole frequency is usually lower than the zero frequency, and the two frequencies can be made to coincide by any of the following means ie. connection of a suitable large-valued resistance between the junction point A, and earth; or connection of a suitable small-valued capacitance across any of the resistors $R_1$, $R_3$, or $R_5$. The impedances of such components are generally required to be an order of magnitude greater than the other components in the basic equalizer circuit.

Another residual effect may be observed after the asymmetry just referred to has been corrected and this is that the characteristic may still not be flat, but exhibit a slight bump at the resonance frequency, again due to the finite bandwidths of the amplifiers. The characteristic can be corrected to exhibit a flat response by connecting a large valued resistor in parallel with either of the capacitors $C_4$ or $C_8$, or a small valued resistor in series with either of the capacitors $C_4$ or $C_8$.

We claim:

1. An active equalizer network including first and second differential input operational amplifiers, an input terminal, an output terminal, a reference terminal, a first, a second, a third and a fourth junction point;
   said first junction point being connected via a first resistance element to the input terminal, and connected via a second resistance element to the output terminal of the first operational amplifier, and connected to the non-inverting input terminal of the second operational amplifier;
   said second junction point being connected via a third resistance element to the output terminal of the first operational amplifier and connected via a first capacitance element to the output terminal of the second operational amplifier;
   said third junction point being connected via a fourth resistance element to the output terminal of the second operational amplifier, and connected via a second capacitance element to the input terminal, and connected to the non-inverting input terminal of the first operational amplifier;
   said fourth junction point being connected via a fifth resistance element to the output terminal of the first operational amplifier, and connected via a sixth resistance element to the reference terminal, and connected to the non-inverting input of the first operational amplifier;
   said output terminal being connected to the output terminal of the first operational amplifier; and
   the inverting input terminal of the first operational amplifier being connected to the second junction point and the inverting input terminal of the second operational amplifier being connected to the third junction point.

2. An active equalizer network including first and second differential input operational amplifiers, an input terminal, an output terminal, a reference terminal, a first, a second, a third and a fourth junction point;
   said first junction point being connected via a first resistance element to the input terminal, and connected via a second resistance element to the output terminal of the first operational amplifier, and connected to the non-inverting input terminal of the second operational amplifier
   said second junction point being connected via a third resistance element to the output terminal of the first operational amplifier and connected via a first capacitance element to the output terminal of the second operational amplifier;
   said third junction point being connected via a fourth resistance element to the output terminal of the second operational amplifier, and connected via a second capacitance element to the input terminal; and connected to the non-inverting input terminal of the first operational amplifier;
   said fourth junction point being connected via a fifth resistance element to the output terminal of the first operational amplifier, and connected via a sixth resistance element to the reference terminal, and connected to the non-inverting input terminal of the first operational amplifier;
   said output terminal being connected to the output terminal of the first operational amplifier; and
   the inverting input terminal of the first operational amplifier being connected to the second junction point and connected to the inverting input terminal of the second operational amplifier.

3. An active equalizer network including first and second differential input operational amplifiers, an input terminal, an output terminal, a reference terminal, a first, a second, a third and a fourth junction point;

said first junction point being connected via a first resistance element to the input terminal, and connected via a second resistance element to the output terminal of the first operational amplifier, and connected to the non-inverting input of the second operational amplifier;

said second junction point being connected via a third resistance element to the output terminal of the first operational amplifier and connected via a first capacitance element to the output terminal of the second operational amplifier;

said third junction point being connected via a fourth resistance element to the output terminal of the second operational amplifier, and connected via a second capacitance element to the input terminal; and connected to the non-inverting input terminal of the first operational amplifier;

said fourth junction point being connected via a fifth resistance element to the output terminal of the first operational amplifier, and connected via a sixth resistance element to the reference terminal, and connected to the non-inverting input terminal of the first operational amplifier;

said output terminal being connected to the output terminal of the first operational amplifier; and the inverting input terminal of the first operational amplifier being connected to the first junction point and to the non-inverting input terminal of the second operational amplifier, and the inverting input terminal of the second operational amplifier being connected to the second junction point.

4. An active equalizer network as claimed in any one of the preceding claims including a seventh resistance element connected between said fourth junction point and the non-inverting input terminal of the first operational amplifier.

5. An active equalizer network as claimed in claim 4 wherein said seventh resistance element is a variable resistor.

6. An active equalizer network as claimed in claims 1, 2 or 3 including an eighth resistance element connected between said fourth junction point and the input terminal.

7. An active equalizer network as claimed in claim 6 wherein the eighth and fifth resistance elements comprise a single potentiometer having a variable tapping point connected to the fourth junction point.

8. An active equalizer network as claimed in claim 6 wherein the junction between the eighth and fifth resistance elements is connected to the fourth junction point via a ninth resistance element.

9. A plurality of equalizer networks as claimed in claim 3 connected in a cascade arrangement.

* * * * *